INVENTORS
Will H. Rowand &
Charles S. Smith
BY
ATTORNEY

Patented Apr. 1, 1952

2,591,299

UNITED STATES PATENT OFFICE 2,591,299

STEAM GENERATING APPARATUS

Will H. Rowand, Madison, and Charles S. Smith, Westfield, N. J., assignors to The Babcock & Wilcox Company, Rockleigh, N. J., a corporation of New Jersey Application April 13, 1946, Serial No. 662,056

3 Claims. (Cl. 122—250)

The present invention relates to vapor generating equipment and more particularly to high pressure, fuel-fired steam generating and storage apparatus for supplying steam intermittently to a steam consuming device at extremely high flow rates over short periods of time, such as in a catapult launching device.

In catapulting heavy objects mechanical propellants, such as springs and the like, are generally impractical due to their complexity and slow speed of reaction, while the use of propellants which develop gaseous pressure as the result of chemical reactions may frequently be dangerous to both the operating personnel and the object launched. In recent years self-propelled objects such as airplanes and missiles have been launched into the air by means of catapult devices which are arranged to uniformly accelerate such objects from rest to a flying velocity in a minimum of time and space.

As an example of the problem of the catapult-launching of such self-propelled objects, a jet engine propelled robot projectile weighing approximately 5,000 pounds must be accelerated from rest to a velocity of approximately 250 miles per hour which is necessary to initiate the operation of its driving engine for sustaining its flight. One of the catapult launching propellants heretofore in use to provide for such an acceleration requirement included the generation of high pressure steam by the dissociation of highly concentrated $H_2O_2$ in the presence of a $KMnO_4$ catalyser, with the steam so generated launching the projectile by forcing a piston through an elongated cylinder on a 150-foot catapult ramp. This piston is connected to the projectile so that the piston will become detached when the piston reaches the end of its predetermined travel at that end of the elongated driving fluid cylinder remote from the source of fluid admission. Such a chemical reaction is violent and difficult to control, and its use resulted many times in the death or injury of the personnel attending the catapult launching apparatus and damage to the projectile. The expansion of an elastic fluid, such as high pressure steam, behind the piston of the catapult results, however, in an advantageously smooth and rapid acceleration of the projectile on the launching ramp and a satisfactory launching velocity at the end of that ramp without damage to the robot controls of the projectile. Thus, the use of high pressure steam as a propellant for the catapult launching piston was found advantageous, but the means used for generating that steam was found to be decidedly unsatisfactory due to the danger of an accident and an unreliable control of the dissociation of the $H_2O_2$. We have found that the advantageous use of steam for purposes of catapult launching may be retained while the danger during its generation will be avoided and a high degree of control attained by the use of a fuel-fired, natural circulation steam generating unit in co-operation with a steam storage space. Such fuel generated steam supplies a readily available source of energy for field use.

The main object of the present invention is to provide apparatus for the production of a high pressure vapor and the intermittent use of that vapor at high flow rates in short periods of time. A further and more specific object is to provide apparatus for the safe production of a vapor propellant capable of accelerating an object launched from a catapult. An additional specific object is to provide apparatus of the character described for generating high pressure steam by the combustion of a fuel, accumulating that steam and intermittently discharging a large amount of that steam in a fraction of a second to a steam consumer. A further object is to provide a steam generating and storage apparatus characterized by its ability to discharge high pressure steam at an exceptionally high rate over a controlled short period of time with a minimum reduction in the steam pressure during the discharge or working period. A further object is the provision of a steam supply apparatus which is safely capable of operating with rapid changes in operating pressures and corresponding temperatures.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Figure 3:
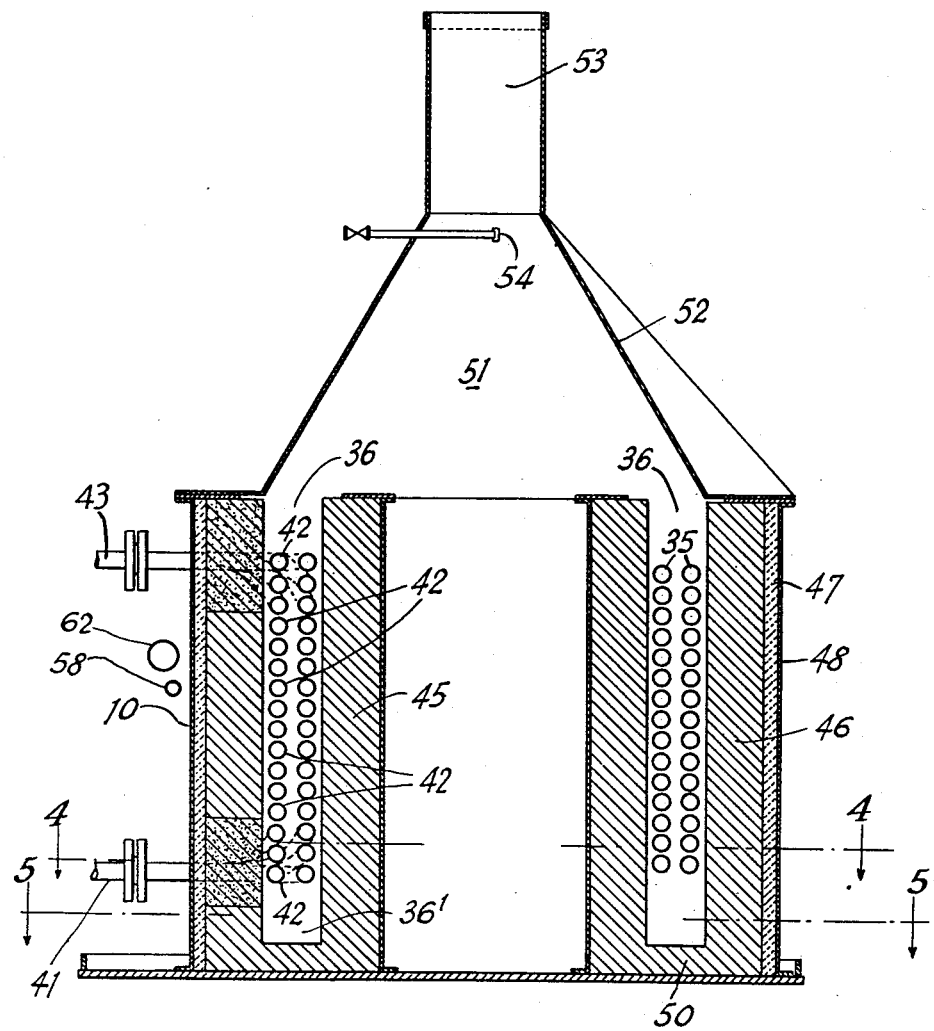
Fig. 3 is a vertical section, of a portion of the apparatus taken on line 3—3 of Fig. 2.
Figure 4:
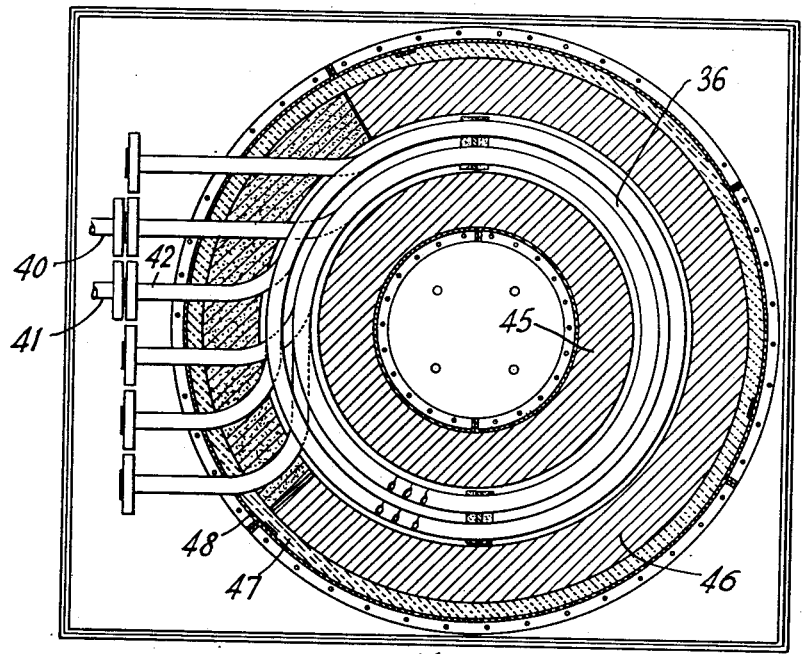
Figure 5:
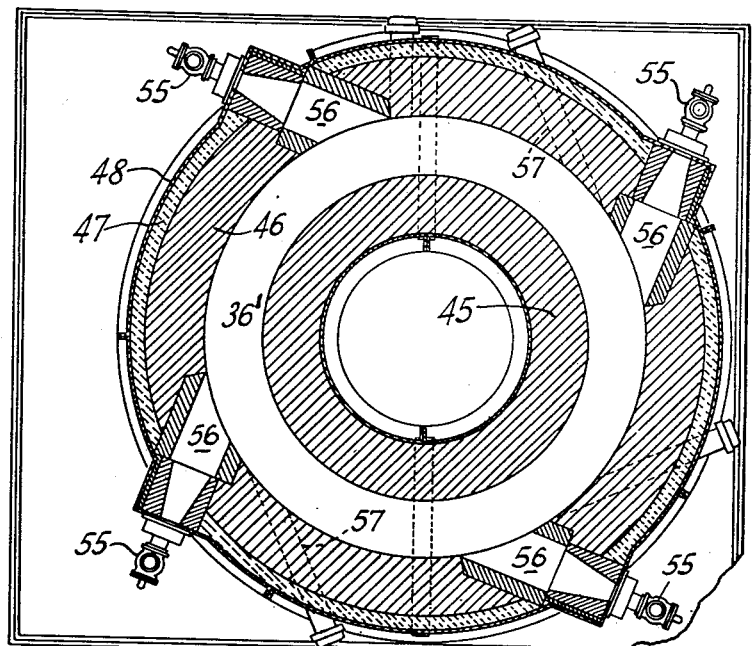
Figure 6:
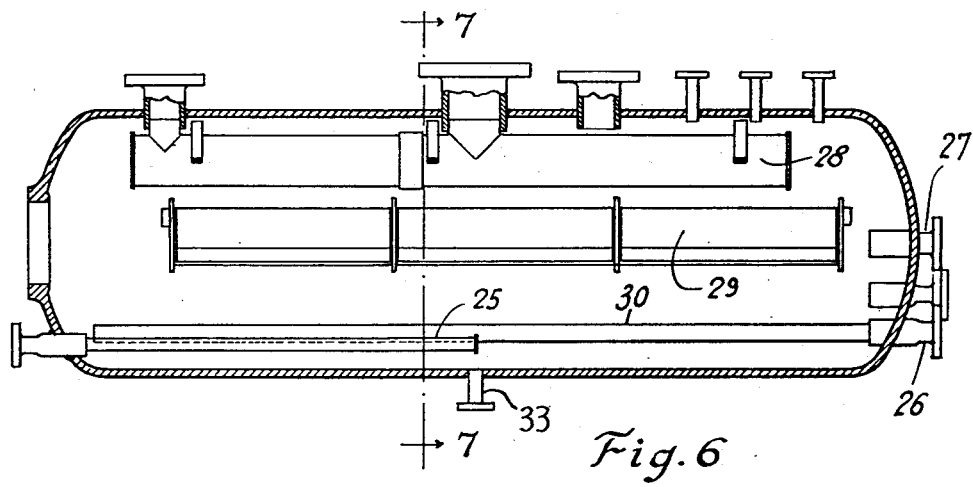
Figure 7:
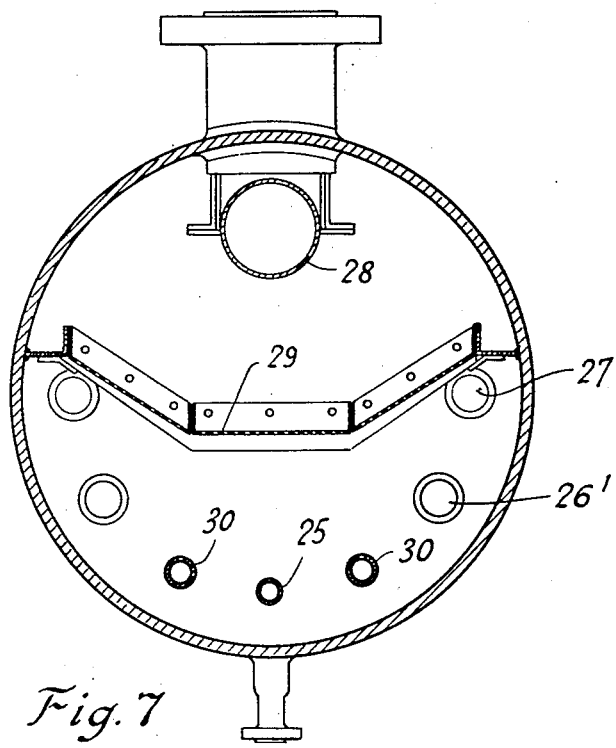

Figs. 4 and 5 are plan views, in section, taken on the lines 4—4 and 5—5 respectively of Fig. 3;

Fig. 6 is a longitudinal view, in section, of the steam and water storage portion of the apparatus;

Fig. 7 is a transverse cross-sectional view taken on line 7—7 of Fig. 6; and

Figure 1:
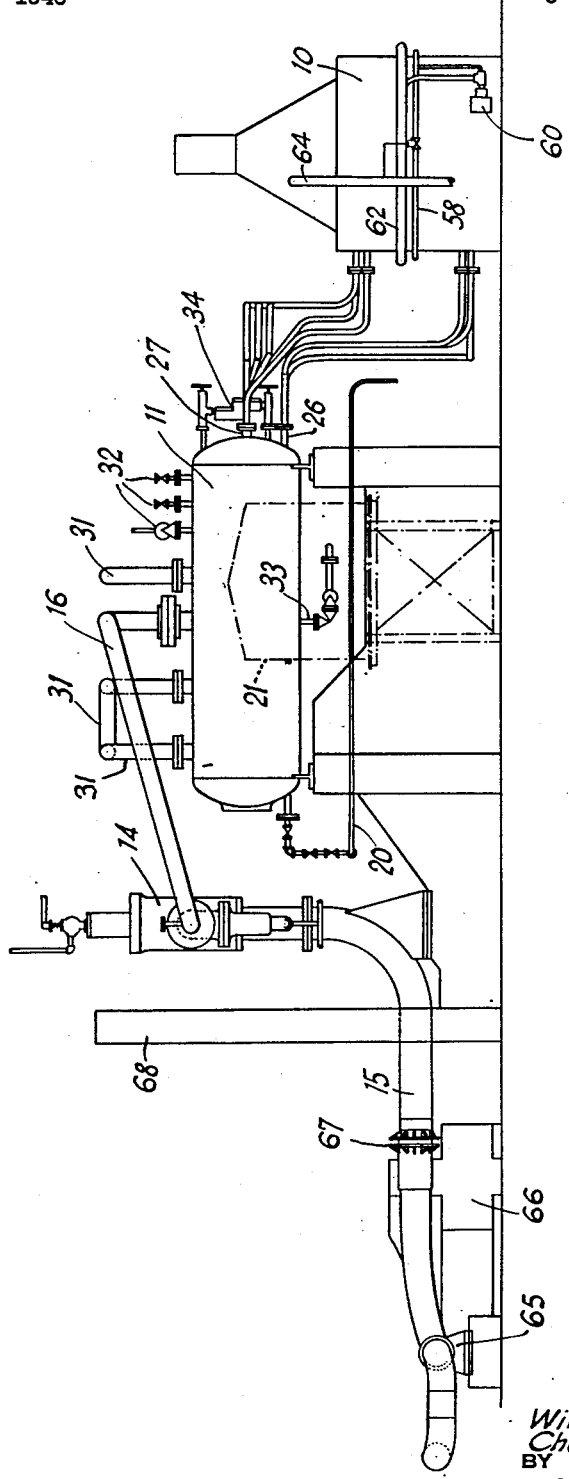
Fig. 1 is an elevation view of the apparatus constructed in accordance with the present invention.
Figure 2:
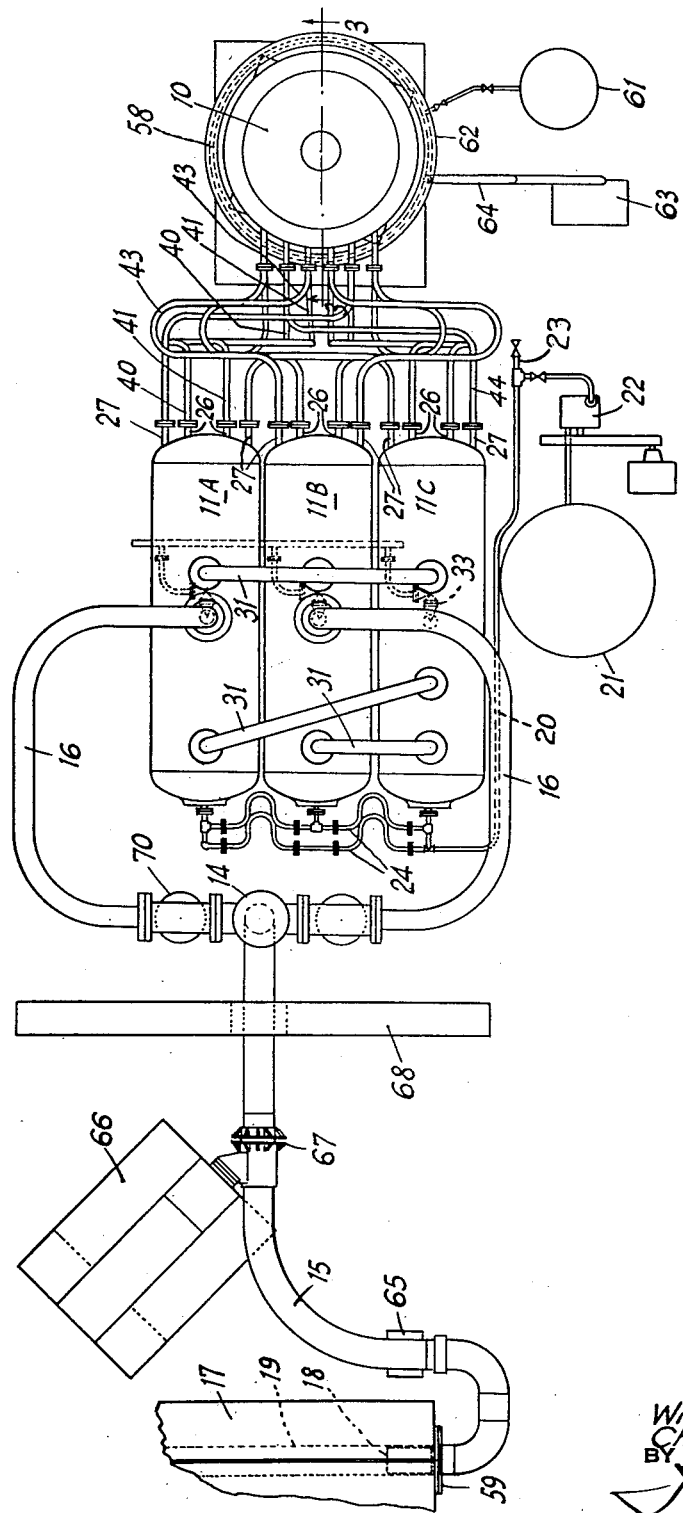
Fig. 2 is a plan view of the apparatus.
Figure 8:
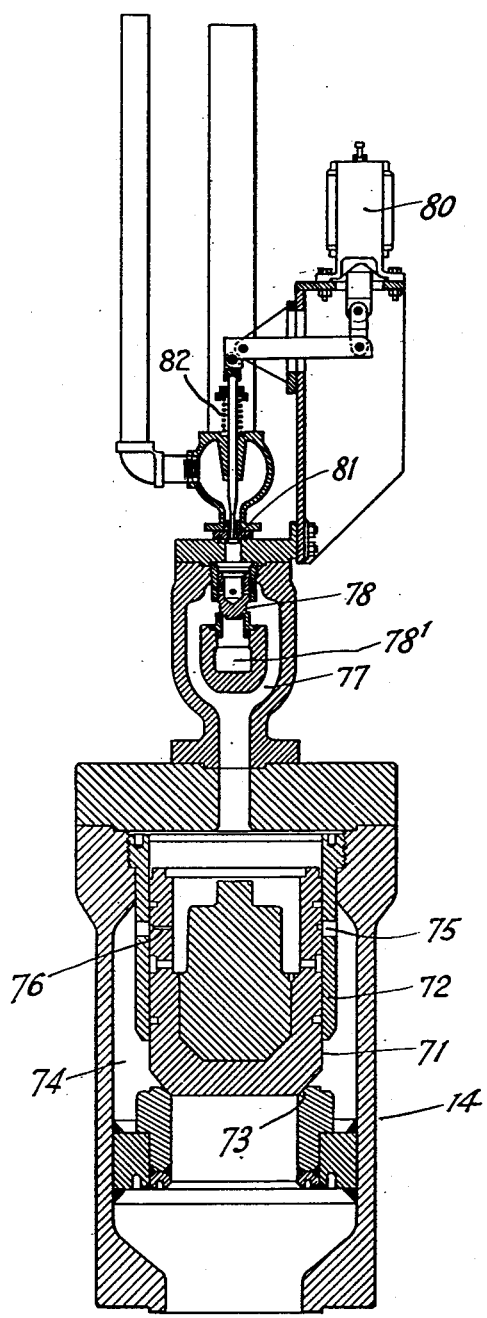

Fig. 8 is an enlarged elevation view, in section, of the valve shown in Figs. 1 and 2.

In the illustrated embodiment of the invention high pressure steam is used as a propellant in the catapult launching of jet engine propelled robot projectiles wherein the propelling steam is generated and intermittently delivered to the catapult for successive projectile launchings. In general, the invention includes a fuel-fired furnace 10 having a steam generating group of coils connected with a group of three elevated steam and water drums 11, and a quick-acting valve 14 in the steam piping connecting the drums 11 with the catapult launching device. The apparatus is arranged for the catapult launching of a robot projectile having an approximate weight of 5,000 pounds, wherein the projectile is accelerated to a velocity of approximately 250 miles per hour upon leaving the end of a 150-foot catapult ramp 17. To attain this acceleration approximately 400 pounds of steam at an initial pressure of approximately 1000 p. s. i. is used to force a piston 18 through a cylinder 19 extending the full length of the catapult ramp. The flow of the steam from the drums 11 to the cylinder 19 is controlled by the valve 14 which, under the above conditions, will be open approximately .8 second subject to an automatic timing device.

Referring particularly to Figs. 1 and 2, the horizontally disposed drums 11 are ordinarily supplied with feed water from a storage tank 21 through a feed water pipe 20 by a gasoline engine driven pump 22, but an alternate connection 23 is provided to the feed pipe 20 for a supply of water from a separate source, if available and when desired. A pair of feed water distributing pipes 24 connect the pipe 20 with the drums 11, with one of these pipes in communication with the outer drums 11A and 11C while the other pipe is in communication with all three drums. Such an arrangement of piping advantageously facilitates a substantially even distribution of feed water to each of the drums.

The feed water entering each drum from a pipe 24 passes through an internal feed water pipe 25 (Fig. 6) which is positioned adjacent the bottom of the drum and discharges that water upwardly through perforation in the portion of the pipe in the mid-section of the drum. A steam discharge nozzle is arranged to deliver steam from the upper steam space of the drum, this nozzle being directly connected to the conventional arrangement of perforated dry pipe 28 extending for the major portion of the drum length.

A transverse baffle made up of a plurality of perforated plate sections 29 is positioned at a level below the normal water level of the drum and extends through the major portion of the drum length. The center plate sections are at a lower level than the inclined side plate sections. The upper edges of the side plate sections are spaced from the sides of the drum walls from which they are supported by bracket members.

A pair of pipes 30 forming a portion of the circulatory path of the steam generating section as hereinafter described extend longitudinally of the drum spaced from the bottom and are provided with longitudinally spaced holes arranged at circumferentially spaced positions. The pipes 30 connect at their outer ends to inwardly extending nozzles 26. A pair of inwardly extending nozzles 27 having flanges external of the drum are positioned in the drum head at a position laterally spaced and at a higher elevation than nozzles 26. The nozzles 26' shown in a blanked-off condition are used in two-drum operation of the apparatus, as hereinafter described.

The steam spaces of the drums are interconnected by a group of steam pipes 31 so as to equalize the steam pressure maintained within the drums during the steam charging and discharging portions of the cycle of operation. In addition, a pair of steam discharge conduits 16 are arranged to receive steam from two of the drums to equalize the steam flow therefrom during the period of steam discharge to the valve 14. Each drum is further provided with the necessary safety and vent valves 32, a drain connection 33, and a water column 34 (Fig. 1).

As shown in Fig. 2, the flanged nozzles 26 of each drum 11 are each connected to an individual downcomer tube leading to the lower ends of the steam generating coils of the furnace 10, and the nozzles 27 are each provided with individual riser tubes also connected with the upper ends of the coils. The furnace is shown in Figs. 3, 4 and 5, and it includes six heat absorbing elements 35 arranged in three axially positioned sets of two coaxial annular helical coils of different diameter positioned in an annular heating gas passage 36 above an annular furnace chamber 36'. Each element has substantially the same surface exposure to the heating gases, and each of the six independent steam generating coils has its lower end connected to a downcomer tube from one drum and its upper discharge end connected to a riser tube of a separate drum. Such an arrangement is important in attaining an advantageous equalization of the delivery of high temperature water and steam to the individual drums. The tube connections between the coils and the drums 11 are provided with loops to permit expansion and contraction thereof without strain on the tube connections to the elements 35 and the nozzles 26 and 27. The coils 35 are formed on radii of approximately twenty-seven and thirty-one tube diameters and the vertical pitch is of the order of 3½ tube diameters providing an inclination sufficient to insure proper upward flow of the generated steam and water mixture under a thermo-syphonic head. The individual coils are fixedly supported at their ends where they pass outwardly through the setting wall and are free in their intermediate lengths to adjust themselves to changes of pressure and temperature.

As an example of the arrangement of tubes connecting the drums 11 and the coils 35, a pair of downcomer tubes 40 and 41 connected to the drum 11A directs the flow of water from that drum to separate coils within the furnace 10. A coil 42 in the furnace, shown particularly in Fig. 3, receives water from the drum 11A through the downcomer tube 41 and discharges steam and water into a riser tube 43 which is connected to the centrally located drum 11B. In a similar manner the downcomer tube 40 passes water from the drum 11A through a coil in the furnace and the steam produced therein discharges through a riser tube 44 into the drum 11C.

The annular furnace chamber 36' and the suerposed gas pass 36 within the furnace 10 is defined by an inner cylindrical refractory wall 45 and an outer refractory wall 46. A portion of the wall 46 is formed of plastic refractory materials in the vicinity of the horizontal extensions of the coils to the downcomer and riser tubes so as to facilitate the construction of a wall that is reasonably air and gas tight during the operation of the furnace. Preferably, the wall 46 including the plastic refractory portion thereof is enclosed by a layer of insulating material 47 and encased in a metallic casing 48. The furnace chamber 36' is also provided with a refractory base 50 and the gas pass 36 is open at the top for the discharge of gases of combustion into a gas outlet chamber 51, formed by a frusto-conical sheet metal hood 52, and thence through a stack 53. As shown in Fig. 3 the upper end portion of the chamber 51 is provided with a compressed air nozzle 54 arranged to discharge compressed air upwardly to assist in the creation of a suitable draft in the furnace, when required, as during initial operation with a cold furnace.

A fluid fuel, such as oil or gasoline, is supplied to a group of four circumferentially equally spaced burners 55 arranged to discharge tangentially into the furnace chamber 36' below the lower portions of the coils. Each of these burners is provided with an ignition chamber 56 set into the wall 46, and each burner is also provided with a port 57 through the wall 46 for use in igniting the fuel and observing combustion conditions within the furnace. As shown in Figs. 1 and 2, the burners receive fuel from an annular fuel manifold 58 supplied by a pump 60 from a fuel storage tank 61. Combustion air for the fuel is delivered to the burners from an annular air manifold 62 which receives air through an air duct 64 from a gasoline engine-driven fan 63.

The steam and water mixture generated within the coils 35 is delivered to the drums 11 and subsequently discharged through the valve 14 to the catapult launching device. The valve 14 is not, per se, part of our invention, but it is a necessary part of and performs an important function in the operation of the steam launching apparatus. Such a valve must be of the quick opening and closing type, and capable of exact regulation as to the time it is open for the flow of steam therethrough. As shown in Fig. 8, this is accomplished by a differential pressure operated piston 71 which is movable in a cylinder 72 and, in its closed position (as shown) bears on a seat 73. With slow opening of the stop valves 70 and with the control valve 14 in a closed position, high pressure steam enters an annular space 74 surrounding the lower portions of the piston 71 through port openings at the front and rear of the body and hollow cylinder 72, and passes through a circumferentially arranged port 75 in the wall of the cylinder 72 and then through a matching radial opening 76 in the valve piston. As steam pressure is developed in the upper portion of the cylinder 72 and above the piston in the annular space 77 surrounding a pilot valve 78 with the pressure therein maintaining the piston 71 in its closed position. When the steam pressure acting on the top of the piston 71 is released, the piston will rise due to the unbalance of pressure and permit the passage of steam. To release this holding steam pressure a solenoid 80 is electrically energized, opening a pilot valve 81 which in turn unbalances the pressures in the pilot valve 78 and permits venting of the steam in the upper part of the cylinder 72 to the atmosphere, through the annular space 77, open valve 78 and discharge port 78'. As long as electric energy is applied to the solenoid 80, the piston 71 will remain open and when the solenoid is de-energized the spring 82 closes the pilot valve 81 which re-establishes pressure conditions, closing the valve 78 and with 78 closed sufficient pressure is developed on the top of piston 71 that it closes by gravity under the influence of the solenoid operated valve. The related parts of the piston valve are proportioned so that it will open in .03 second and close in an equally short period of time.

The length of time the valve 14 is open may be controlled by the use of an electric cut-off switch (not shown) located adjacent the discharge end of the ramp which will operate to interrupt the flow of electric current to the solenoid, thereby shutting off the steam by closing the valve 14.

The steam main 15 is attached to the lower end of the catapult cylinder 19 by any convenient and well-known means, such as a breechlock 59. Since the reaction of the steam acting on the piston 18 will tend to develop a heavy thrust upon the steam main, the portion of the main closest to the ramp 17 is securely anchored in position, as at 65 and 66, and a conventional expansion joint 67 is inserted in the main 15 between the anchor 66 and the valve 14. Thus, expansion of the steam main between the drums 11 and the anchor 66 is accommodated in the expansion joint 67 without subjecting the valve 14 to expansion stresses and strains.

A protecting wall 68 is interposed between the ramp 17 and the steam generating and discharging apparatus to avoid damage to the latter due to any mishap in the catapult launching of objects.

In the operation of the described apparatus, steam is generated by the combustion of fuel in the furnace chamber 36 and delivered to the drums 11 until a desired steam pressure is obtained. In the embodiment of the invention described, this pressure will be between 1000 and 1100 p. s. i. and when this pressure is reached the furnace may be intermittently fired or fired at a reduced rate to maintain the desired pressure by compensating for radiation losses from the apparatus. Due to the interconnection of the drums 11 the steam pressure and water temperature therein will be substantially equal both during the period of steam generation when the furnace is in use, and also when the furnace is idle with the steam pressure within the drums at the desired value.

When the projectile or other object is ready for catapult launching the fuel supply to the furnace is shut off, the valves 70 opened and the valve 14 opened for the passage of steam therethrough to the piston 18. During the period of time the valve 14 is open approximately 400 pounds of steam are discharged from the drums 11 and since the amount of steam storage space therein is insufficient to supply that quantity of steam, the pressure within the drums will be reduced and a fraction of the water therein will flash to steam and be delivered to the catapult at a gradually reducing pressure.

In the actual operation of the apparatus described the steam pressure within the drums 11, each of which are approximately forty-eight inches in diameter and twelve feet long, was raised to a pressure of from 1000 to 1100 p. s. i. during the steam generating portion of the cycle prior to launching a projectile from the catapult ramp 17. During this same period the water level within the drums would be approximately one inch above the drum center lines and the steam pressure and water temperatures within the drums were also maintained substantially equal due to the effective interconnection of the drums with each other and with the furnace 10. Immediately after the discharge of approximately 400 pounds of high pressure steam from the apparatus the pressure of steam within the drums had dropped approximately 100 p. s. i. and the water level had likewise dropped approximately 1 to 1½ inches.

As an alternate to the operation described, a series of experiments were conducted wherein the drum 11C was disconnected from the apparatus and the equipment operated with only two drums, namely 11A and 11B. With the exception of an anticipated greater, and generally proportionate, pressure drop of steam in the drums during the catapult launching operation and a corresponding lowering of drum water level, such an arrangement was also successful. Obviously the limits of steam storage capacity and size of related equipment will be dependent upon the characteristics of the steam consumer and the limits, if any, of water carry-over from the steam accumulating drums to the catapult.

It will be noted in the apparatus described that its operation is such as to subject the equipment to severe temperature changes and that for uniform and satisfactorily safe operation the distribution of steam and water to the multiple drums must be equalized with respect to temperatures and pressures. To avoid excessive localized temperature stresses in the drum shell the feed water, which will normally be at a substantially lower temperature than the water within the drums during the intermittent operation of the apparatus, is introduced upwardly into the mass of water within the lower portion of the drum in the vicinity of the drum center. Likewise, the water supply to the downcomer tubes is collected from longitudinally spaced points within the drum by the pipes 30, thereby tending to equalize the water flow condition and the water temperature within that drum. The severity of service requirements with this apparatus is also well exemplified in the temperature changes in the furnace, wherein the steam generating cycle of operations will vary from idle periods without the use of fuel to full fuel flow to the burners in short periods of time. This is, of course, a characteristic of intermittent operation and subjects the steam generating elements of the furnace to temperature changes which are advantageously accommodated in the furnace construction described.

Inasmuch as a large portion of the steam used in the catapult launching is obtained by flashing the water in the drums due to the reduction of steam pressure the drums are arranged to accommodate this functional characteristic. One of the characteristics of this operation lies in the high ratio of water and steam storage to steam generating capacity as compared with customary steam generating apparatus. This further necessitates a relatively large steam disengaging surface of the water in the drums. This may be supplied in a single, large drum, but is advantageously obtained in a plurality of smaller drums. The smaller diameter drums can be constructed with relatively thinner shell plate which is of advantage in the use of such drums under conditions of rapid temperature and pressure changes, as the use of thinner drum shell plates is conducive to lower temperature developed stresses. Such temperature and pressure changes within the drum result entirely from the heat and pressure of the contained steam and water, and the drums are not directly exposed to heat input from heat of high temperature gases such as products of combustion.

As the steam delivered from the steam and water drums to point of use is delivered in part from the storage in the steam spaces and in part from the flashing of a portion of the high temperature water in the lower half of the drum to steam upon reduction in pressure, the submerged baffle member is an important factor in controlling the ebullition of flashed steam through the mass of water so that on rapid changes of pressure the lifting of the water level will be minimized.

What is claimed is:

1. A coil type natural circulation steam generating element comprising an annular furnace chamber and superposed annular gas pass, a circumferential series of equally spaced tangentially arranged fuel burners in said furnace chamber, a plurality of separate heat absorbing elements arranged in parallel and having substantially the same surface areas arranged in axially positioned sets of coaxial annular helical coils of different diameter within said annular gas pass, means for delivering water to the lower end of each of said coils from separate sources, and means receiving substantially equal quantities of steam generated within said coils from the upper ends thereof.

2. A coil type natural circulation steam generating element comprising an annular furnace chamber, a circumferentially equally spaced series of tangentially arranged fuel burners in the lower portion of said furnace chamber, a plurality of separate tubular coils arranged in superposed and nested relationship within said annular furnace chamber, a substantially horizontal extension to the lower end of each coil projecting outwardly of said furnace chamber and ending in a horizontal plane common to all lower coil extensions, means for delivering water to the lower end of each of said coils from separate sources, a substantially horizontal extension to the upper end of each coil projecting outwardly of said furnace chamber and ending in a horizontal plane common to all upper coil extensions, the upper horizontal extension of each coil substantially arranged in vertical alignment with the lower horizontal extension of the same coil, and means receiving substantially equal quantities of steam generated within each of said coils from the upper ends thereof.

3. In a unit for the generation of high pressure steam, means forming an upright furnace chamber and a gas pass superposed relative thereto, a series of circumferentially spaced and substantially tangentially arranged fuel burners associated with the furnace chamber for firing the same, a plurality of separate tubular heat absorbing elements having substantially equal surface areas exposed to the elements of combustion from the operation of said burners and arranged in axially successive sets of co-axial annular helical coils disposed within the path of the furnace gases from the burners, the number of heat absorbing elements being a multiple of the number of drums, riser tubes conducting steam from the coils to the drums, each of said coils having tubular water delivering means conducting water from the water space of one of the drums to the inlet of the coil and having its riser tube conducting steam from its outlet to another of the drums, tubular connections between the steam spaces of the drums, and discharge conduit means for conducting high pressure steam from a plurality of the drums to a common point.

WILL H. ROWAND.
CHARLES S. SMITH.

REFERENCES CITED

The following references are of record in the file of this patent:

UNITED STATES PATENTS

| Number | Name | Date |
|---|---|---|
| 653,436 | Buck | July 10, 1900 |
| 850,818 | Cape et al. | Apr. 16, 1907 |
| 979,844 | Grever | Dec. 27, 1910 |
| 1,347,105 | Mesurier | July 20, 1920 |
| 1,591,236 | Sando | July 6, 1926 |
| 1,609,661 | Quinn et al. | Dec. 7, 1926 |
| 1,668,098 | Wettstein | May 1, 1928 |
| 1,700,961 | Vaughn | Feb. 5, 1929 |
| 1,896,308 | Hellborg | Feb. 7, 1933 |
| 1,917,617 | Ulrich | July 11, 1933 |
| 1,939,415 | Schaub | Dec. 12, 1933 |
| 1,973,968 | Weigel et al. | Sept. 18, 1934 |
| 1,998,329 | Mechekke | Apr. 16, 1935 |
| 2,072,675 | Hartmann | Mar. 2, 1937 |
| 2,200,427 | Merz | May 14, 1940 |
| 2,247,595 | Besler | July 1, 1941 |
| 2,336,958 | Plant | Dec. 14, 1943 |

FOREIGN PATENTS

| Number | Country | Date |
|---|---|---|
| 478,427 | Great Britain | Jan. 18, 1938 |